United States Patent [19]

Cathignol et al.

[11] 4,417,584

[45] Nov. 29, 1983

[54] REAL-TIME MEASURING METHOD AND APPARATUS DISPLAYING FLOW VELOCITIES IN A SEGMENT OF VESSEL

[75] Inventors: Dominique Cathignol, Genas; Jean-Yves Chapelon, Saint-Etienne, both of France

[73] Assignee: Institut National de la Sante et de la Recherche Medicale, Paris, France

[21] Appl. No.: 379,978

[22] Filed: May 19, 1982

[30] Foreign Application Priority Data

May 25, 1981 [FR] France ................................ 81 10833

[51] Int. Cl.³ ............................................. A61B 10/00
[52] U.S. Cl. .................................. 128/663; 73/861.25
[58] Field of Search ...................... 128/663; 73/861.06, 73/861.25; 367/89, 100

[56] References Cited

U.S. PATENT DOCUMENTS

| | | | |
|---|---|---|---|
| 3,762,221 | 10/1973 | Coulthard | 73/861.25 |
| 3,940,731 | 2/1976 | Cooper et al. | 367/100 X |
| 4,019,038 | 4/1977 | Critten et al. | 73/861.06 X |
| 4,320,765 | 3/1982 | Cathignol et al. | 367/100 X |

OTHER PUBLICATIONS

Cathignol, D. J. et al., "Transcutaneous BF Measurements Using Pseudorandom Noise Doppler System", IEEE BME Trans vol. 27 #1 Jan. 1980.

Olinger, M. et al, "Implementation of a High-Resolution Bloodflow Imaging System Using Large Time Bandwidth Product Pseudo-Noise Sequences" 1978 UTS Symp Proc., IEEE Cat. #78ch 1344-ISU Cherry Hill, N.J. 25-27 Sep. 1978.

Primary Examiner—Kyle L. Howell
Assistant Examiner—Francis J. Jaworski
Attorney, Agent, or Firm—Lerner, David, Littenberg, Krumholz & Mentlik

[57] ABSTRACT

The invention relates to a Doppler velocimeter comprising a transmitter composed of a plurality of independent transducers for generating beams of ultrasonic energy, an ultrasonic generator for generating a plurality of noise signals, each noise signal being independent of the other, and a receiver for receiving beams of ultrasonic energy reflected from a target. Each noise signal is applied to several of the plurality of transducers and maintained separately upon generation of the beams of ultrasonic energy. Received ultrasonic energy is processed through the use of groups of dual correlators, further processed and displayed. The invention finds an application in the real-time display of blood flow velocities in a segment of blood vessel.

12 Claims, 5 Drawing Figures

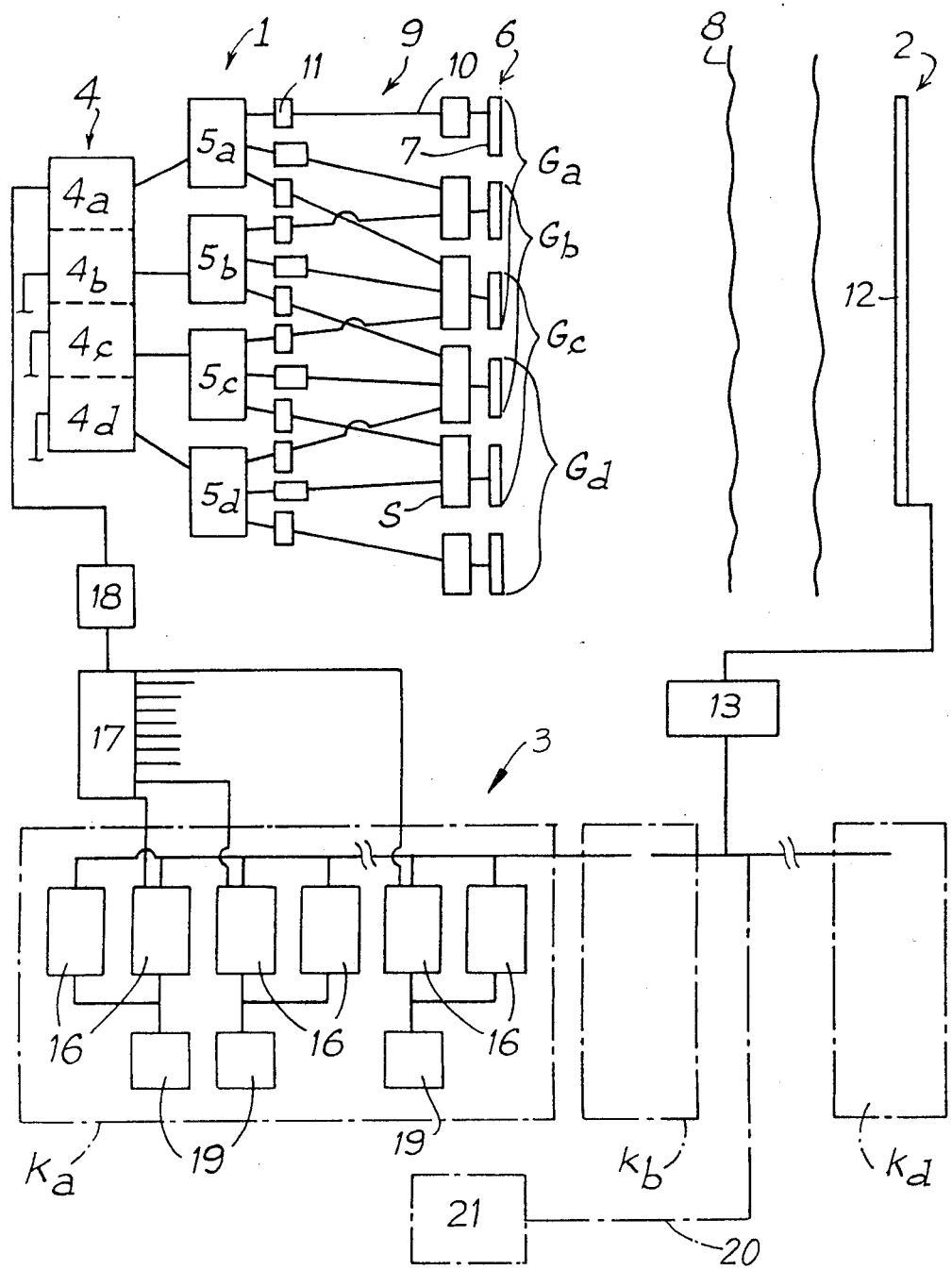

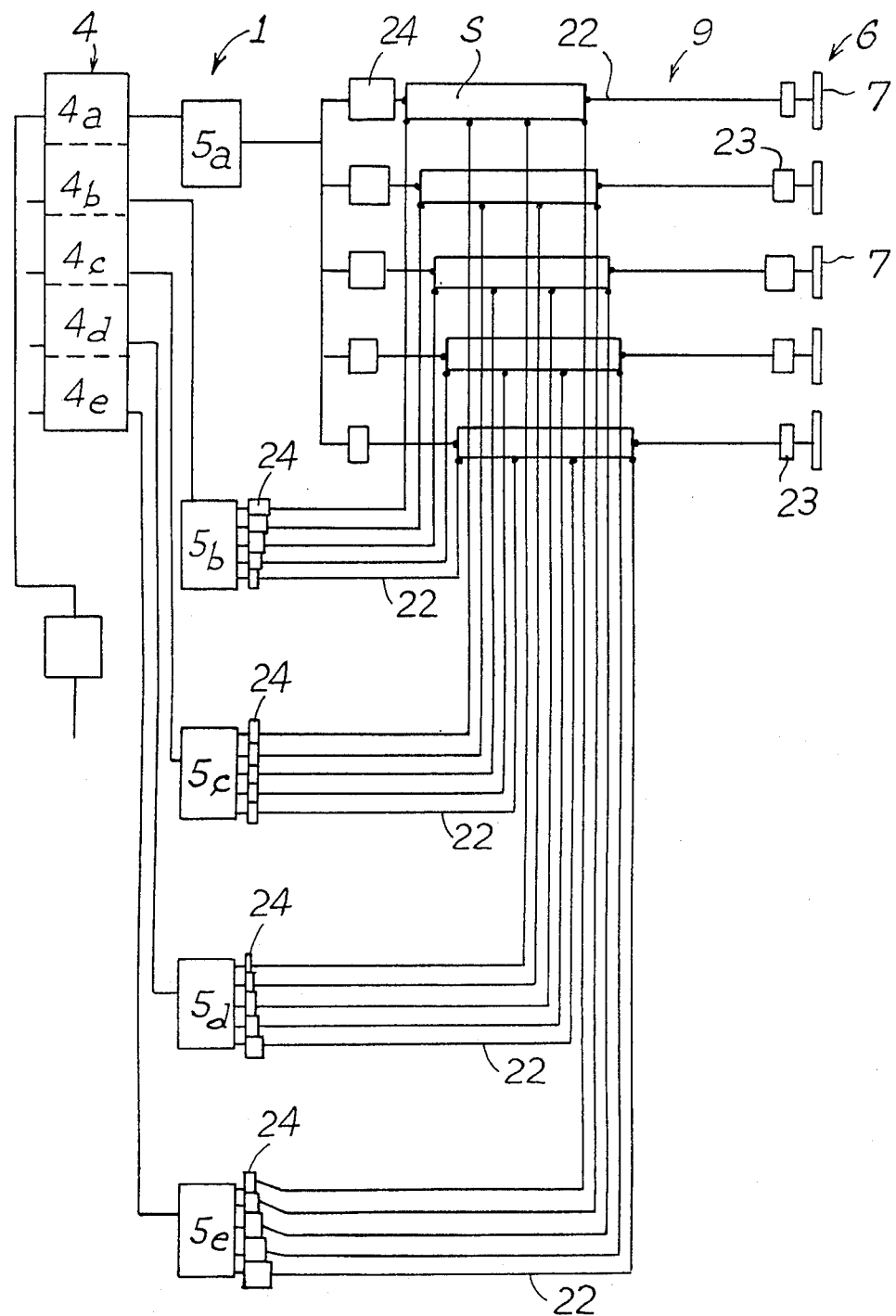

REAL-TIME MEASURING METHOD AND APPARATUS DISPLAYING FLOW VELOCITIES IN A SEGMENT OF VESSEL

BACKGROUND OF THE INVENTION

The present invention concerns flow velocity measurement and display techniques, and in particular the measurement of blood flow in blood vessels, veins or arteries, using methods non-invasive to the patient.

In many cases, certain parameters, need to be considered when assessing flow velocities, so that, in an application to the medical field, a precise diagnosis can be given of the instantaneous and local condition of a segment of blood vessel.

Two types of equipment are already known which have tried to solve the aforesaid problems, each one collecting information by measuring means and supplying processable electrical signals which are applied to a display equipment of a known type, through the technical means currently used to produce images on a screen.

These two types of already known equipment differ by the design of the measuring element which in one case, is a continuous-transmission Doppler velocimeter, and in the second case, a pulsed-transmission Doppler velocimeter.

In the technique using the continuous-transmission Doppler velocimeter, the emitting transducer emits a continuous ultrasonic beam pointed in the direction of the area to be scanned, to produce a reflected beam which is picked up by a transmit-receive transducer.

The scanning field of the transmitted beam can in a way be monitored as a measuring band and enables the mean value of the different flow velocities encountered along said measuring line to be obtained.

When a measurement has been taken in a given position, then the scanning field should be shifted by lateral translation of the transmitted beam, in order to proceed with scanning and measuring of a second juxtaposed segment of vessel.

The shifting from one measuring band to another can be done mechanically, thus permitting use of a focussed transducer, providing, a good transverse resolution. However, it is conceivable that such a system cannot validly be used when the object is to obtain a real-time display, namely a display permitting a monitoring of any instantaneous alteration. Indeed, the mechanical shifting of the transmitter makes it impossible to obtain, within a short period of time, a sufficient number of transverse measurements permitting a real-time display.

It is possible to resort to a different system, using an electronic shift. To this effect, the transmitter is composed of a large number of small-size transducers, in alignment, which can be successively switched over to the transmitting generator, each one thus delivering a separate ultrasonic beam pointed in the direction of the area to be scanned. This type of apparatus eliminates any subjection inherent in the mechanical shift, but it also has a considerable number of disadvantages. Indeed, because of the small size of the transducers, there is scattering of each transmitted beam, hence, a poor lateral resolution. This disadvantage does not permit measurements over a great number of parallel, close-together bands, so that the object, which is to obtain a real-time display of the scanned area, is not achieved.

The second technique consists in using, as measuring apparatus, a pulse-transmission Doppler velocimeter. As in the preceding example, a beam is transmitted to define a measuring line. Said pulsed ultrasonic beam enables measurement of the velocity along several successive points on the measuring line. It becomes then possible to obtain, not really a measurement of the mean velocity, as with the continuous-transmission velocimeter, but a measurement which corresponds to successive points on one line and therefore, a point-by-point transverse assessment of the flowing velocity inside part of a segment of vessel.

With such a technique, it should nonetheless be proceeded as indicated hereinabove to obtain several successive measuring lines. As in the preceding case, the shifting from one measuring line to another can be effected mechanically or, preferably electronically, but with the same disadvantages as those already indicated.

Such technique therefore does not permit real-time simultaneous information for a large number of lines to be obtained nor an instantaneous display of a large area of a segment of vessel.

Another disadvantage with this technique resides in the fact that it is not possible to use a pulse repetition rate permitting to reach without ambiguity, relatively important scanning depths, greater in any case than 1 or 2 cm, in the Doppler frequency ranges normally encountered.

Such a limitation is a real drawback in the technical field concerned here.

It is the object of the present invention to solve the afore-mentioned problem and to propose a new method and new equipment permitting to obtain the real-time measurement and display of flow velocities in segments of vessel.

And it is a particular object of the invention to obtain such results but with those devices, receiving or utilizing supplied electronic information, conventionally used to display information of any type of display screen.

The object of the invention is more particularly to propose a method and apparatus which can be used in the medical field for reading information relative to parameters of blood circulation in blood-vessels, veins or arteries, without resorting to invasive devices.

A further object of the invention is to propose a new method and new equipment which are also adapted to supply, in addition, electrical information capable of simultaneously feeding echography apparatus.

SUMMARY OF THE INVENTION

These objects are achieved according to the teachings of the present invention with a measuring method permitting the real-time display of a flow velocity, which, with a Doppler effect ultrasonic velocimeter, comprises:

using a transmitter composed of physically-separated transducers, simultaneously generating a number m of pseudorandom noise signals, coded independently one from the other, applying said noise signals simultaneously to the transducers in order to transmit as many ultrasonic beams, interposing, between a noise generator and the transducers, means for separating the different beams, thus defining as many measuring lines pointed in the direction of the area to be scanned, collecting all the reflected echos at a receiver, pointing these reflected echos in the direction of an amplifier having m groups of dual correlators connected thereto, applying to the dual correlators noise signals corresponding to the group concerned, which noise signals are picked up from the generator and transmitted by a time-delay circuit in order to obtain for each line, n separate measurement points, and finally feeding the n measurement points of the m measuring lines to an instant display apparatus, displaying an image of n.m points.

The invention also relates to a measuring apparatus, of the type comprising a Doppler effect ultrasonic velocimeter comprising a transmitter, transmitting a beam pointed in the direction of the area to be scanned, and a receiver, receiving the beam reflected by said area, said receiver being associated with a measuring-by-correlation chain feeding low-frequency signals to a terminal, said measuring apparatus comprising:

a transmitter composed of separate and aligned transducers, at least a generator of m coded pseudorandom noise signals, independent one from the other, means permitting coded noise signals to be applied simultaneously to at least some of the transducers, means permitting separation of the beams transmitted by the transducers, a receiver to receive the reflected beams, and a processing sequence following the receiver and comprising:
an amplifier,
m groups of n dual correlators,
m time-delay circuits, connected to the outputs of the generator of m noise signals and each comprising n outputs connected to the dual correlators of the group concerned,
an assembly for processing and displaying the different signals output by the different correlators.

DESCRIPTION OF THE DRAWINGS

The invention will be more readily understood on reading the following description with reference to the accompanying drawings in which:

FIGS. 1 and 1a are diagrams of a first embodiment of the invention,

FIGS. 2 and 2a are diagrams illustrating a variant embodiment of the invention,

DETAILED DESCRIPTION OF THE INVENTION

To eliminate the disadvantages of the known apparatus, which proceed by measurement readings along successive measuring lines, the method according to the invention proposes to use several pseudorandom ultrasonic noise signals, having the same properties but being independent one from the other, i.e. having no action one on the other. Said simultaneous ultrasonic noise signals are applied to an array of transducers, in order to obtain the transmission of as many ultrasonic beams as there are independent noise signals. Said different ultrasonic beams are separated one from the other, right from the transmitter transducers, so as to define parallel measuring lines, which are all separate one from the other, and have a high power of lateral resolution. These different beams are pointed in the direction of the area to be scanned, in order to produce as many reflected beams at a receiver, preferably a single receiver. Thus is created, simultaneously, a series m of independent parallel measuring lines each having a level which enables, due to the fact that the transmitted ultrasonic noise signals are coded, measurement of n successive separate points.

In this way, a matrix of n points by m lines is obtained which supplies a group of information or simultaneous echos of reception which are sent in the direction of a processing sequence at the level of which the different items of information picked-up, are separated to define as many processing channels. For each channel, the measurement of each point is correlated in reference to the delayed basic transmission. The signals obtained can then be fed directly to a conventional display unit.

Figure 1A:
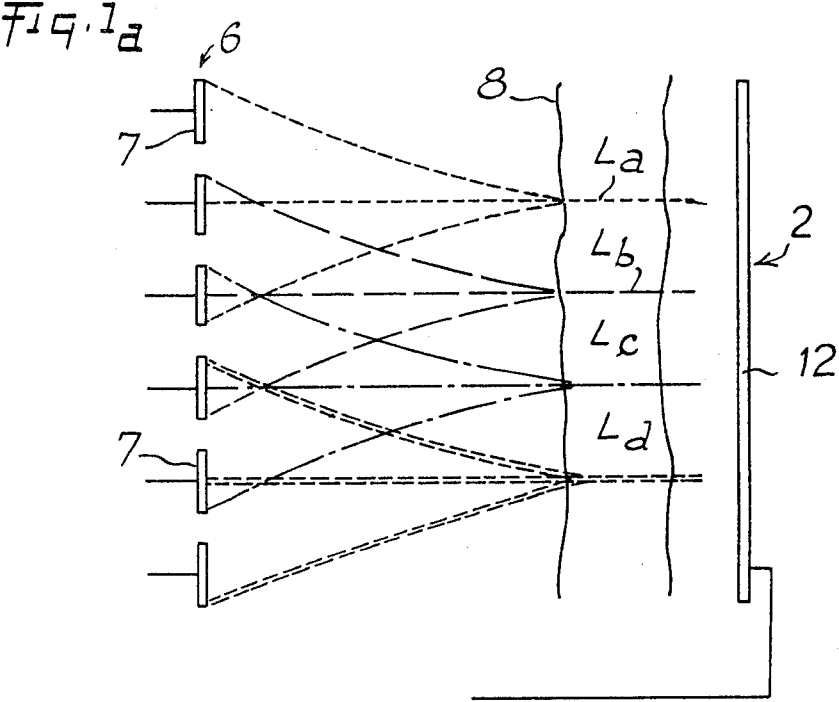

To carry out the aforesaid method, FIGS. 1 and 1a show a first technical solution which uses a Doppler effect velocimeter comprising a transmitter 1, a receiver 2 and a processing sequence 3.

The transmitter 1 comprises a generator 4 of m coded pseudorandom noise signals, independent one from the other. The drawing shows by way of example, a generator 4, with four generating cells 4a–4d, designed to transmit simultaneously, four independent coded pseudorandom ultrasonic noise signals. Each cell is electrically connected to its own amplifier 5a–5d which is designed to supply an array 6 of transducers 7, all of which are borne by a common support while being physically separated.

Said array 6 is pointed in the direction of the area to be scanned of a segment of vessel 8. The diagram in FIG. 1 shows a disposition wherein the array 6 is parallel to the segment 8. It should however be considered that the array 6 is in practice inclined with respect to the axis of the segment, as required and known for measurements by Doppler effect, the inclination being of the order of 30° with respect to the axis of the vessel.

According to a first embodiment of the invention, each amplifier 5 is simultaneously connected to a group G of transducers 7 to which the corresponding noise signal is therefore simultaneously applied. In the diagrammatically illustrated example, each amplifier is connected to three transducers 7 one placed after the other within the array 6. Moreover, according to a disposition of the invention, each successive amplifier is connected to a group G of three transducers 7, offset by one pitch with respect to the group of transducers corresponding to the adjacent amplifier, such a pitch being constituted in the illustrated example by a transducer. Consequently, the electric connection between two successive amplifiers uses two groups of separate transducers with however transducers in common, i.e. two in the illustrated example. FIG. 1 shows that amplifiers 5a, 5b, 5c and 5d are respectively connected to groups Ga, Gb, Gc and Gd. The application of the different noise signals is effected for each transducer 7 through an adder S.

According to the invention, an array 6 is composed of a number of physically separated transducers 7 which are equal in number to the number m of different noise signals, multiplied by the offset pitch between two groups of transducers and added to the number of transducers less one per group. In the case illustrated in FIG. 1, wherein the generator 4 outputs four independent pseudorandom noise signals, each of which are applied to a group of three transducers offset by a pitch equal to one transducer, the strip 6 is therefore constituted by the succession of six transducers 7.

According to the invention, the apparatus described hereinabove comprises means 9 permitting separate beams emitted by the array 6 in the direction of the segment 8. Said means 9 use the special electric connection, set up as indicated hereinabove, between each amplifier and a group of transducers 7 and are completed by the use of electronic delay units 11 placed on each electric connection 10 between one amplifier and the transducers 7 of the corresponding group G. For each group of transducers 7 supplied from the same amplifier, the units 11 are designed so that the transducers concerned produce a joint ultrasonic beam which is focussed for example in the direction of the axis of the central transducer. Thus, a measuring line is set up which will go through the area to be scanned and has a particularly high power of resolution compared with the adjacent independent measuring line.

According to FIG. 1a, the beams transmitted by the transducers 7 are represented, for amplifier 5a, by a dotted line producing a measuring line La, for the amplifier 5b, by a broken line producing a measuring line Lb, for amplifier 5c, by a chain-dotted line producing a measuring line Lc and for amplifier 5d by two broken lines producing a measuring line Ld. Thus, the four measuring lines La, Lb, Lc and Ld are perfectly separate one from the other at the level of area 8 to be scanned although all the beams transmitted are issued from transducers, of which some at least, also contribute to transmitting a different beam.

According to the invention, the reflected beams corresponding to the measuring lines La, Lb, Lc and Ld are picked up by the receiver 2. Considering that the noise signals are independent one from the other, the receiver 2 can be composed of a single transducer 12 covering the whole range of longitudinal efficiency or of possible simultaneous measurements through lines La to Ld. The transducer 12 is connected to an amplifier 13 of which the output is by-pass connected to a number m of groups Ka ... Kd of dual correlators 16 provided in equal number to the groups Ga ... Gd. Each group K comprises a number n of dual correlators 16 corresponding to the number of measuring points per measuring line. Said correlators 16 receive a comparative information issued from a delay circuit 17 specific to the noise signal, which is fed, via a delay unit 18, from the cell generating the corresponding independent pseudorandom noise signal. In the illustrated example the delay circuit 17 is connected to the output of the cell 4a and comprises ten output channels, thereby permitting measurement of 10 different points on line La. Each output of the delay circuit is connected to a different correlator 16 of the same group K thus delivering 2n different Doppler low-frequency signals. The processing sequence 3 thus provides a matrix of two m.n signals which are transmitted via transfer units 19, to an equipment, not shown, of real-time simultaneous display of all the processable signals supplied, which signals, being grouped in pairs, give n direction-sensitive values.

In other words, according to the invention, and considering the examples illustrated in FIG. 1, the measuring apparatus provides measurement of the velocity in 10 points along four separate and parallel simultaneous measuring lines and consequently applies, in real time to the display unit, forty items of information permitting the display of measurement characteristics of the flow velocities in the area of segment 8 covered by the scanning field of the array.

It is thus possible to discover instantaneously any variations in flow velocities and to determine whether a localized variation of velocity is for example due to an alteration of the flowing section of segment 8.

FIG. 1 shows in chain-dotted line a development wherein a by-pass connection 20 to echograph apparatus 21 is provided. It becomes thus possible to display the fixed targets simultaneously and to obtain an image which is representative of the structural condition of the vein 8.

To give a practical example, an apparatus of the above type can be designed to scan a 4 cm-long segment 8, using a transmitter which defines sixteen separate and independent measuring lines, each one permitting a reading of 10 specific points. The transmission frequency is 5 megahertz and the power transmitted is equal to or less than 100 $mW/cm^2$ of transducer surface. The array 6 can for example comprise 68 elements of 0.6 mm width, each one composed of a wide-band transducer in the case where one pitch of four transducers is held back with a group of five transducers for each independent coded pseudorandom noise signal transmitted.

It is possible because of the special characteristics of such an apparatus to envisage measuring a maximum detectable velocity of 1 m/s at a depth reaching 7.5 cm, using a single receiver constituted by a 40 mm-long bar. The aforesaid means permit a transverse separation of two measuring lines of 2.6 mm, a longitudinal separation of two consecutive points between 0.6 and 2.4 mm and a scanning depth for the first measuring point of each line of between 0 and 7.5 cm.

FIG. 2 shows another embodiment of the apparatus, still comprising a transmitter 1, a receiver 2 and a processing sequence 3, these last two elements being identical to those described with reference to the example illustrated in FIG. 1.

In this variant, the generator 4 of the transmitter 1 comprises for example, five cells 4a to 4e feeding five amplifiers 5a to 5e. Each amplifier 5 is connected, via separating and focussing means 9 to the transducers 7 of an array 6. The means 9 use, for each amplifier 5, electric connection means 22 with each transducer 7 of the array 6. Thus, each transducer 7 receives simultaneously, via an adder, the independent pseudorandom ultrasonic noise signals issued from the different amplifiers 5.

The means 9 further comprise electronic delay focussing units 23 interposed between the transducers 7 and the electric connection assembly 22 corresponding to the assembly of amplifiers 5, so as to be somehow common to all the amplifiers. The electronic delay units 23 are diagrammatically illustrated in the drawing so as to produce for a given noise, a focussing of the overall beam transmitted by the transducers 7 and, for example, centered on the middle transducer.

Figure 2A:
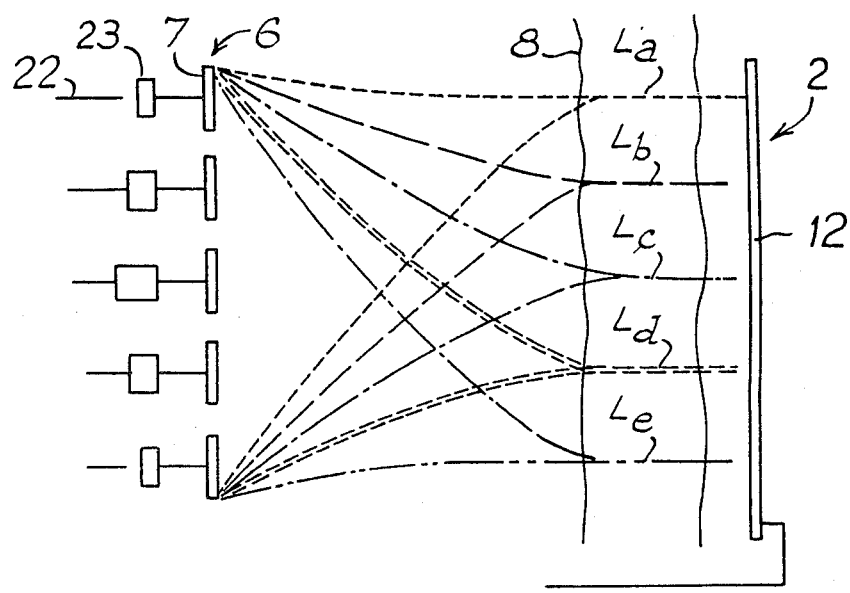

According to the invention, the means 9 also make use of each separate pseudorandom noise signal, through the electronic orientation delay units 24 situated on the electrical connections 22 of each amplifier 5. Said units 24 are determined so that, by combining their effect with that of the joint electronic delay focussing unit 23, a different independent beam is produced for each noise signal, which beam is focussed with relative transverse shift, so as to produce simultaneously, as illustrated in FIG. 2a, five measuring lines La to Le in the direction of area 8. The five simultaneous beams are illustrated differently by a dotted line for the beam of line La, by a broken line for the beam of line Lb, by a chain-dotted line for the beam of line Lc, by two dotted lines for the beam of line Ld and by a mixed broken line for the beam of line Le.

The delay units 24 are consequently all different, on the one hand, for each connection 22 connecting the same amplifier to all the transducers 7 and, on the other hand, for two amplifiers considered, so as to produce, in combination with delay units 23 a focussing and orientation permitting transmission of beams which are sufficiently concentrated on the level of the area to be scanned, and sufficiently shifted laterally one with respect to the other, to obtain a suitable lateral resolution.

In the example described hereinabove, the information picked up by the receiver 2 is processed as before by way of processing sequence 3.

Figure 3:
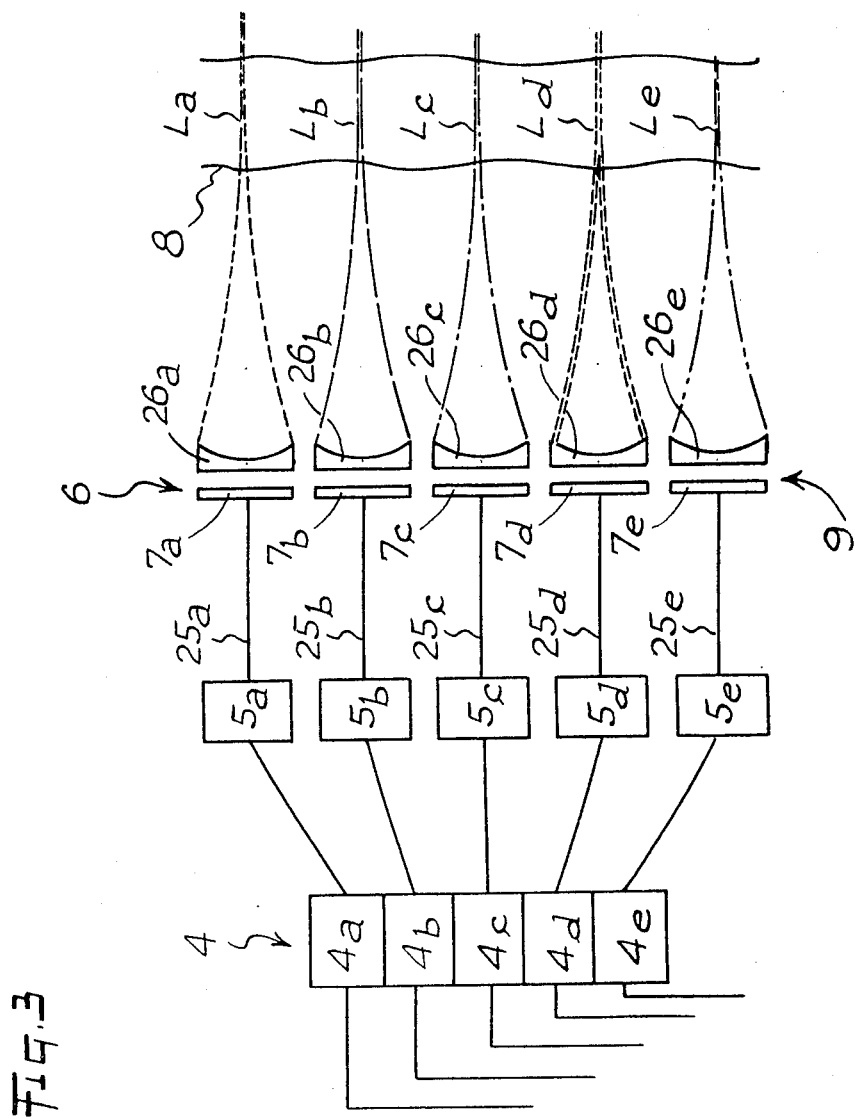
FIG. 3 is a diagram of another variant embodiment of the invention.

FIG. 3 shows another variant embodiment wherein the transmitter 1 also comprises a generator 4 generating m coded pseudorandom noise signals, independent one from the other, m being equal to five in the illustrated example. Said generator 4 thus comprises, as in the preceding example, five cells 4a to 4e. The transmitter 1 comprises an array 6 of transducers 7, physically separated and pointed in the direction of a segment of vessel 8 to be scanned. Although this is not shown, the velocimeter is completed by a receiver 2, preferably a single-bar receiver and by a processing sequence 3 such as that described in reference to FIG. 1.

Cells 4a to 4e are individually associated to specific amplifiers 5a to 5e which are connected by means 9 to the transducers 7. According to this variant, as many transducers 7 are provided as number m and the means 9 first of all comprise one electrical connection 25 between each amplifier and a transducer 7. In FIG. 3, the electric connections 25 have the same reference as the amplifiers and transducers corresponding to them. Thus, each independent pseudorandom ultrasonic noise is applied to one specific transducer, all the transducers being however fed simultaneously. The means 9 further comprise, a focussing device 26 for each transducer, for example a lens of the concave plane type.

The aforesaid means enable from m simultaneous noises, to separate and focus m beams defining m measuring lines L which are caused to go through the segment 8. In FIG. 3, the lines L have the same reference as the corresponding transducer. The simultaneous beams produce echos received by the receiver 2 and processed as indicated hereinabove by the processing sequence 3.

As can be seen from the foregoing, the invention achieves the expected object which is to measure and display any changes in flow velocities, simultaneously, in several juxtaposed sections of a segment of vessel, and this in the range of depths and velocities encountered. The invention finds a preferred application in the display in image form, of the blood flow velocity inside a blood vessel, vein or artery.

The invention is in no way limited to the description given hereinabove and on the contrary covers any modifications that can be brought thereto without departing from the scope thereof.

What is claimed is:

1. A method of real-time measurement and display of flow velocities using a Doppler effect ultrasonic velocimeter comprising the steps of:

simultaneously generating from noise generator means a number m of pseudorandom noise signals, coded independently one from the other, applying said noise signals simultaneously to a transmitter composed of physically separated transducers to transmit m ultrasonic beams, interposing, between said noise generator means and the transducers, means for separating the different beams, to define m measuring lines pointed in the direction of the area to be scanned, collecting reflected echos from said area to be scanned on a receiver, applying signals representing said reflected echos to amplifier means having m groups of dual correlators, each of said m groups of dual correlators being associated with a corresponding one of said m noise signals, applying to said dual correlators the noise signal corresponding to the group associated therewith, said noise signal being applied from the noise generator means and transmitted by a time-delay circuit in order to obtain for each line n separate measurement points, and applying said n measurement points of the m measuring lines to display means for displaying an image of nxm points.

2. The method according to claim 1, wherein said noise generator means comprises a plurality of individual noise generators and said method further includes the steps of transmitting a first coded noise signal from a specific one of said noise generators and applying said first noise signal to one group of transducers, placed in succession, on the level of the transmitter, then transmitting a second noise signal, from another noise generator, which second noise signal is independent of the first noise signal, applying said second noise signal to another group of transducers placed in succession, said another group of transducers including at least one transducer which is common to the first group of transducers and repeating these operations for each different noise signal m, and interposing electronic delay units between each generator and the corresponding group of transducers to cause focussing of the ultrasonic beam transmitted by the group concerned.

3. The method according to claim 1, wherein said method includes the steps of transmitting each independent noise signal from specific noise generators, simultaneously applying all noise signals generated to all the transducers, interposing electronic delay focussing means between the transducers and the plurality of individual noise generators, amplifying the noise signal from each specific noise generator through individual amplifier means and providing one electronic delay orientation means for each noise signal at each of said individual amplifier means.

4. The method according to claim 1, wherein said method includes the steps of transmitting m independent noise signals, applying each noise signal to one specific transducer, and providing each transducer with means for focussing the beam transmitted by said transducer.

5. The method according to any one of claims 1, 2, 3 or 4 additionally comprising the steps of simultaneously applying output information from said receiver to echography means.

6. Improved apparatus for real-time measurement and display of flow velocity in a segment of vessel of the type comprising a Doppler effect ultrasonic velocimeter, said apparatus including transmitter means for transmitting a beam pointed in the direction of an area to be scanned, and receiver means for receiving portions of said beam reflected by said area, said receiver means being associated with a measurement-by-correlation means for applying low-frequency signals to a terminal, the improvement comprising:

transmitting means including a plurality of separate and aligned transducers for transmitting beams of ultrasonic energy, generator means for generating m coded pseudorandom noise signals; each of said random noise signals being independent of the other, means for applying coded noise signals simultaneously to at least several of said plurality of transducers, means for separating the beams transmitted by the transducers, means for receiving portions of reflected beams from said area, and processing means connected to said means for receiving, said processor means including:
an amplifier,
m groups of n dual correlator means,
m time-delay circuits, each of said time-delay circuits being connected to an associated output of the generator means for generating m noise signals and each of said m time-delay circuits generating n outputs, each of said n outputs of said m time-delay circuits being connected to an associated one of said n dual correlators within an associated one of said m groups, and
means for processing and displaying output signals from said correlators.

7. The apparatus according to claim 6 additionally comprising a specific amplifier connected to said generator means for each independent coded pseudorandom noise signal generated, means establishing an electrical connection between each said specific amplifier and a group of transducers, said group of transducers having at least one transducer therein which is common to at least one other group of transducers, electronic delay means interposed in each means for establishing for each transducer for ensuring focussing of the beam transmitted by the group of transducers in the direction of the area to be scanned.

8. The apparatus according to claim 7 wherein said plurality of transducers are equal in number to the number of different noise signals generated, multiplied by the offset pitch between two groups of transducers and added to the number of transducers less one per group.

9. The apparatus according to claim 6 additionally comprising a specific amplifier connected to said generator means for each independent coded pseudorandom noise signal generated, means establishing an electric connection between each amplifier and all the transducers, one electronic delay orientation means for each amplifier interposed between the latter and the transducers, and joint electronic delay focussing means interposed between the transducers and the amplifiers.

10. The apparatus according to claim 6, wherein each transducer receives noise signals via an adder.

11. The apparatus according to claim 6 additionally comprising amplifier means for each noise signal generated, means for connecting each amplifier means to only one transducer, and focussing means for each transducer.

12. The apparatus according to claim 6, wherein the means for receiving is configured by a single transducer.

* * * * *